(12) United States Patent
Ma et al.

(10) Patent No.: US 11,509,770 B2
(45) Date of Patent: Nov. 22, 2022

(54) LIVE AGENT RECOMMENDATION FOR A HUMAN-ROBOT SYMBIOSIS CONVERSATION SYSTEM

(71) Applicant: INTERNATIONAL BUSINESS MACHINES CORPORATION, Armonk, NY (US)

(72) Inventors: Jie Ma, Nanjing (CN); Xin Zhou, Beijing (CN); Hao Chen, Beijing (CN); Rachel Mohammed, Wobrun, MA (US); Christopher J. Davis, Boulder, CO (US); Sharath Kancharla, Malden, MA (US); Zhongzheng Shu, Malden, MA (US); Manon Knoertzer, Saint Martin le Vinoux (FR); Ran Guan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1094 days.

(21) Appl. No.: 16/141,223

(22) Filed: Sep. 25, 2018

(65) Prior Publication Data
US 2020/0099790 A1    Mar. 26, 2020

(51) Int. Cl.
*H04M 3/523* (2006.01)
*G06N 3/04* (2006.01)
(Continued)

(52) U.S. Cl.
CPC ........ *H04M 3/5233* (2013.01); *G06N 3/0454* (2013.01); *G06Q 10/063112* (2013.01);
(Continued)

(58) Field of Classification Search
CPC ......... G06N 3/0454; G06Q 10/063112; G06Q 30/016; G10L 15/16; G10L 15/22;
(Continued)

(56) References Cited

U.S. PATENT DOCUMENTS 6,859,529 B2   2/2005  Duncan et al.
8,737,599 B2   5/2014  Kannan et al.
(Continued)

FOREIGN PATENT DOCUMENTS

KR    20080097751 A    11/2008
WO    2018057951 A2    3/2018

OTHER PUBLICATIONS

IP.Com, "Cognitive Qualification, Rating and Settlement for Service Agent Interactions", IP.com Disclosure No. IPCOM000251535D. Nov. 8, 2017. pp. 1-2.

*Primary Examiner* — Harry S Hong
(74) *Attorney, Agent, or Firm* — Tutunjian & Bitetto, P.C.; Joseph Petrokaitis

(57) ABSTRACT

A computer-implemented method is presented for selecting a preferred live agent from a plurality of live agents. The method includes constructing, via the processor, a human expertise matrix pertaining to each of the plurality of live agents by determining an average net promoter score (NPS) for each of the plurality of live agents for each category of a plurality of categories, and in response to a voice call by a user, determining, via the processor, a predicted human expertise on average by collectively assessing the human expertise matrix, a predicted NPS derived from a first deep neural network, and a predicted category derived from a second deep neural network. The method further includes, based on the predicted human expertise on average determined, triggering communication via the live agent communication network between the user and the preferred live agent to initiate a conversation between the user and the preferred live agent.

20 Claims, 10 Drawing Sheets

(51) Int. Cl.
*G06Q 10/06* (2012.01)
*G06Q 30/00* (2012.01)
*G10L 15/16* (2006.01)
*G10L 15/22* (2006.01)

(52) U.S. Cl.
CPC ............ *G06Q 30/016* (2013.01); *G10L 15/16* (2013.01); *G10L 15/22* (2013.01); *G10L 2015/223* (2013.01); *H04M 2203/40* (2013.01)

(58) Field of Classification Search
CPC ... G10L 2015/223; H04M 3/51; H04M 3/523; H04M 3/5233; H04M 2203/40
USPC ....................... 379/265.11 to, 265.13; 706/21
See application file for complete search history.

(56) References Cited

U.S. PATENT DOCUMENTS

| | | |
|---|---|---|
| 9,553,990 B2 | 1/2017 | Sloan et al. |
| 9,571,636 B2 * | 2/2017 | Kumar .............. H04M 3/42144 |
| 9,609,132 B2 | 3/2017 | Tuchman et al. |
| 9,635,181 B1 | 4/2017 | McGann et al. |
| 2014/0161247 A1* | 6/2014 | Wawrzynowicz .. H04M 3/5232 379/265.11 |
| 2014/0314225 A1 | 10/2014 | Riahi et al. |
| 2015/0066479 A1 | 3/2015 | Pasupalak et al. |
| 2015/0215463 A1 | 7/2015 | Shaffer et al. |
| 2017/0013130 A1* | 1/2017 | Hall ................... H04M 3/5233 |

* cited by examiner

LIVE AGENT RECOMMENDATION FOR A HUMAN-ROBOT SYMBIOSIS CONVERSATION SYSTEM

BACKGROUND

Technical Field

The present invention relates generally to connecting users with agents, and more specifically, to a live agent recommendation for a human-robot symbiosis conversation system.

Description of the Related Art

Companies provide traditional communications mechanisms such as account managers, customer service representatives, subject matter experts, interactive voice response (IVR) units, websites, email, and live agents to handle user communications such as comments, inquiries, complaints, recommendations, and clarifications. Live agents, however, have limitations, such as limited working hours, limited capacity, limited knowledge levels or skill sets, etc., that make it impractical to guarantee, for example, that the best live agent is always available to assist a particular customer whenever that customer has a need to contact the contact center, or that the same answer is provided to different customers experiencing the same situation.

SUMMARY

In accordance with an embodiment, a method is provided for selecting a preferred live agent from a plurality of live agents. The method includes constructing, via the processor, a human expertise matrix pertaining to each of the plurality of live agents by determining an average net promoter score (NPS) for each of the plurality of live agents for each category of a plurality of categories, in response to a voice call by a user, determining, via the processor, a predicted human expertise on average by collectively assessing the human expertise matrix, a predicted NPS derived from a first deep neural network, and a predicted category derived from a second deep neural network, and based on the predicted human expertise on average determined, triggering communication via the live agent communication network between the user and the preferred live agent to initiate a conversation between the user and the preferred live agent.

In accordance with another embodiment, a system is provided for selecting a preferred live agent from a plurality of live agents. The system includes a memory and one or more processors in communication with the memory configured to construct, via the processor, a human expertise matrix pertaining to each of the plurality of live agents by determining an average net promoter score (NPS) for each of the plurality of live agents for each category of a plurality of categories, in response to a voice call by a user, determine, via the processor, a predicted human expertise on average by collectively assessing the human expertise matrix, a predicted NPS derived from a first deep neural network, and a predicted category derived from a second deep neural network, and based on the predicted human expertise on average determined, trigger communication via the live agent communication network between the user and the preferred live agent to initiate a conversation between the user and the preferred live agent.

In accordance with yet another embodiment, a non-transitory computer-readable storage medium comprising a computer-readable program for selecting a preferred live agent from a plurality of live agents is presented. The non-transitory computer-readable storage medium performs the steps of constructing, via the processor, a human expertise matrix pertaining to each of the plurality of live agents by determining an average net promoter score (NPS) for each of the plurality of live agents for each category of a plurality of categories, in response to a voice call by a user, determining, via the processor, a predicted human expertise on average by collectively assessing the human expertise matrix, a predicted NPS derived from a first deep neural network, and a predicted category derived from a second deep neural network, and based on the predicted human expertise on average determined, triggering communication via the live agent communication network between the user and the preferred live agent to initiate a conversation between the user and the preferred live agent.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Figure 1:
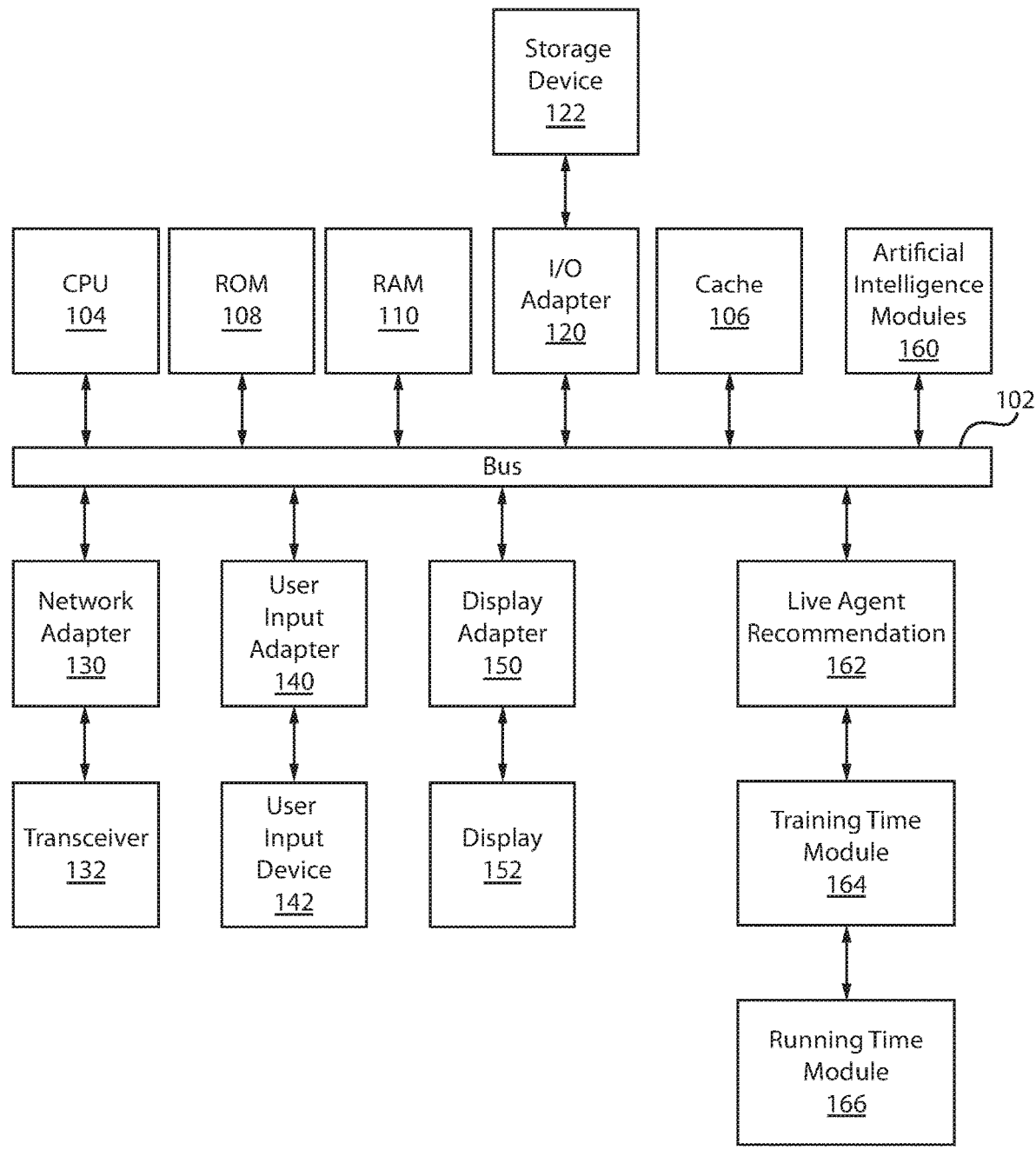
FIG. 1 is an exemplary processing system for live agent recommendations, in accordance with embodiments of the present invention.

Embodiments in accordance with the present invention provide methods and devices for implementing artificial intelligence in live agent recommendations scenarios. In general, computer solutions, and in particular algorithms and processes known as artificial intelligence, are in use to an ever increasing extent by companies wishing to communicate with clients or customers. The main benefit is that the cost of implementing an artificial intelligence solution is a fraction of the cost of employing people to perform the same role. However, there are technical difficulties in implementing such a system based on artificial intelligence. For instance, while for simple queries the system can be relatively efficient, in the case of more complex queries, or ones that have never before been presented to the system, current solutions are inadequate, as time and processing resources are wasted in attempts to resolve the issues using existing artificial intelligence techniques. This leads to a heavy burden on the system in terms of the memory and processing resources needed, in addition to a poor rate of user satisfaction.

The operation of existing contact centers lacks sophisticated personalized service, especially in the self-service mode through interactive voice response (IVR)-type interfaces. Customers tend to prefer interacting with live agents versus the limited and impersonalized service available from IVR interfaces. However, live agents often lack the skills, or give inappropriate or inconsistent assistance in contact center environments, where customers often experience a different live agent with every attempt to address a concern or problem.

Embodiments in accordance with the present invention provide methods and devices for implementing machine learning or deep neural network techniques to recommend the best suited or preferred agent on hand to address these and other deficiencies of randomly selecting live agents and/or IVR interfaces. The selection of an appropriate or best suited or preferred agent for routing an inbound call can be based on determining a highest overall net promoter score (NPS) for a live agent from a database of live agents. The live agent receiving the highest overall NPS can be selected to field the call from the customer. In accordance with the present invention, methods and devices provide for two deep neural networks to be implemented, one for determining NPS and another for determining categories or skills or tasks. This results in two deep neural network outputs, that is, a predicted NPS value and a predicted category distribution function.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

FIG. 1 is an exemplary processing system for live agent recommendations, in accordance with embodiments of the present invention.

The processing system includes at least one processor (CPU) 104 operatively coupled to other components via a system bus 102. A cache 106, a Read Only Memory (ROM) 108, a Random Access Memory (RAM) 110, an input/output (I/O) adapter 120, a network adapter 130, a user interface adapter 140, and a display adapter 150, are operatively coupled to the system bus 102. Additionally, an artificial intelligence module 160 can be connected to the system bus 102. Moreover, a live agent recommendation system 162 can be connected to the system bus 102 in order to execute a training time module 164 and a running time module 166.

A storage device 122 is operatively coupled to system bus 102 by the I/O adapter 120. The storage device 122 can be any of a disk storage device (e.g., a magnetic or optical disk storage device), a solid state magnetic device, and so forth.

A transceiver 132 is operatively coupled to system bus 102 by network adapter 130.

User input devices 142 are operatively coupled to system bus 102 by user interface adapter 140. The user input devices 142 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 142 can be the same type of user input device or different types of user input devices. The user input devices 142 are used to input and output information to and from the processing system.

A display device 152 is operatively coupled to system bus 102 by display adapter 150.

Of course, the processing system for live agent recommendations can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system for live agent recommendations are readily contemplated by one of ordinary skill in the art given the teachings of the present invention provided herein.

Figure 2:
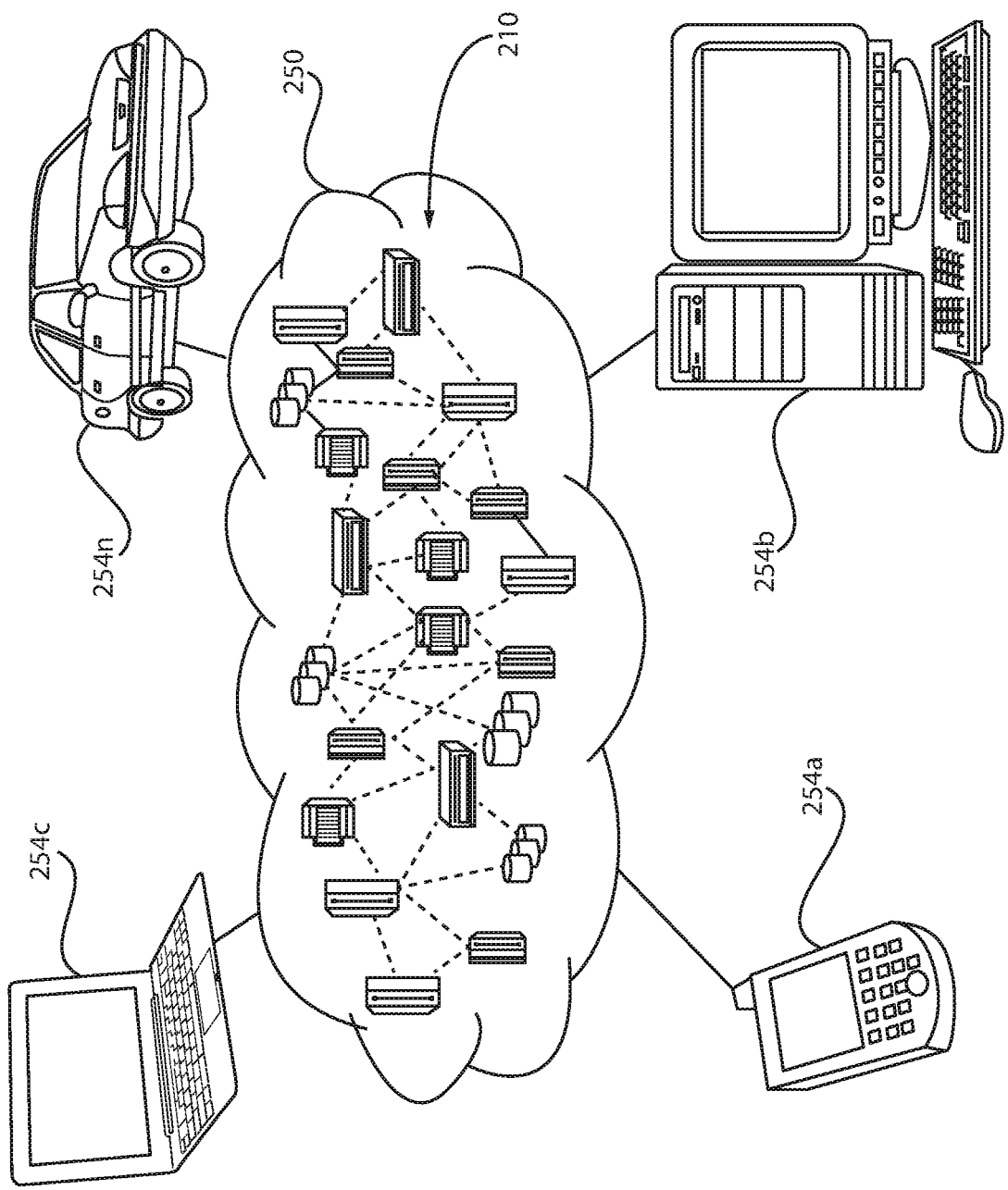
FIG. 2 is a block/flow diagram of an exemplary cloud computing environment, in accordance with an embodiment of the present invention.

FIG. 2 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 250 is depicted for enabling use cases of the present invention. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N can communicate. Nodes 210 can communicate with one another. They can be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
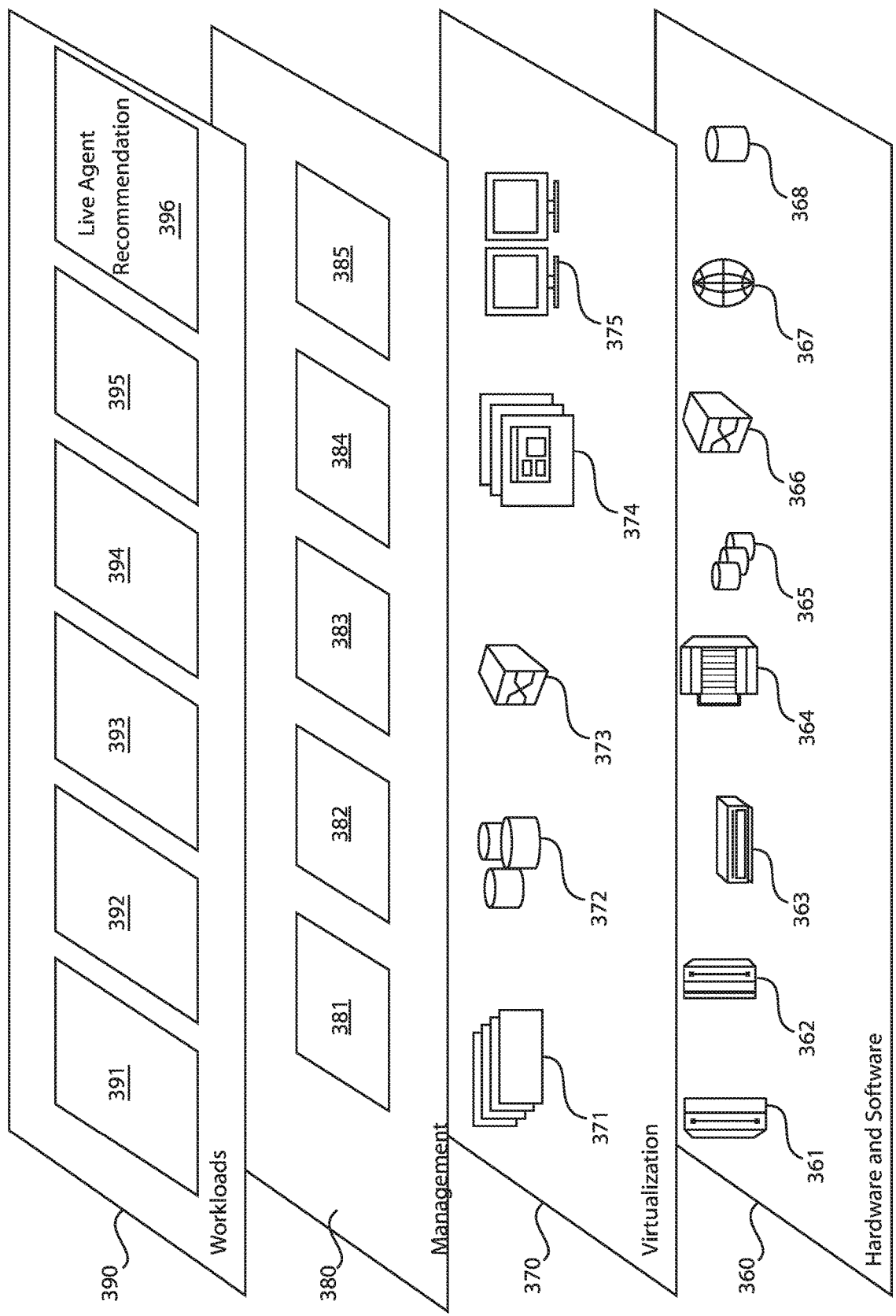
FIG. 3 is a schematic diagram of exemplary abstraction model layers, in accordance with an embodiment of the present invention.

FIG. 3 is a schematic diagram of exemplary abstraction model layers, in accordance with an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities can be provided: virtual servers 371; virtual storage 372; virtual networks 373, including virtual private networks; virtual applications and operating systems 374; and virtual clients 375.

In one example, management layer 380 can provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment can be utilized. Examples of workloads and functions which can be provided from this layer include: mapping and navigation 391; software development and lifecycle management 392; virtual classroom education delivery 393; data analytics processing 394; transaction processing 395; and a live agent recommendation system 396.

Figure 4:
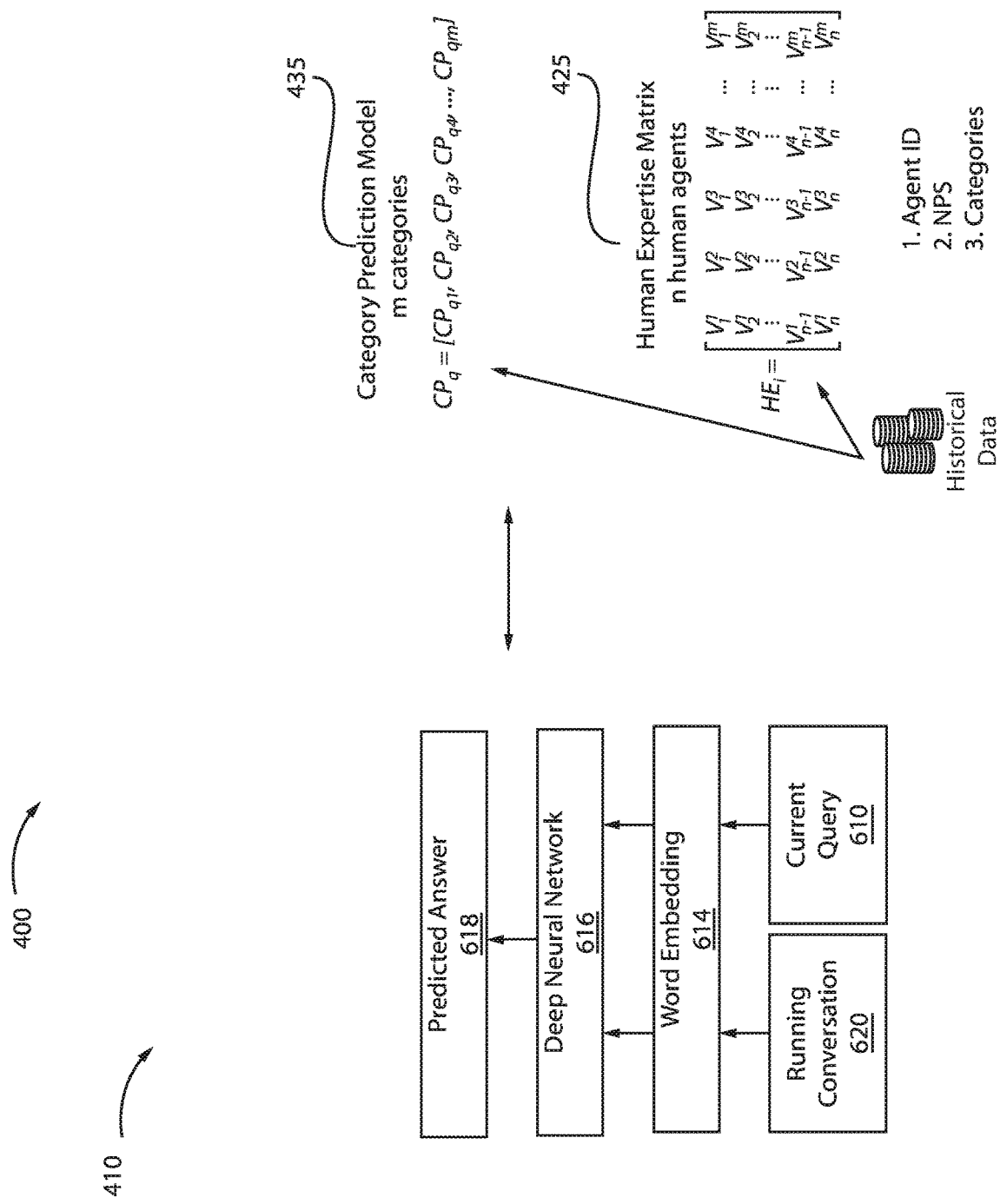
FIG. 4 is a block/flow diagram of an example system for determining training time, in accordance with an embodiment of the present invention.

FIG. 4 is a block/flow diagram of an example system for determining training time, in accordance with an embodiment of the present invention.

The system 400 for determining training time includes a human expertise matrix 425 and a category prediction model 435.

The human expertise matrix 425 is learned under different categories based on net promoter score (NPS). The human expertise matrix 425 includes an NPS for each agent based on a plurality of categories or skills or topics. The NPS can be determined based on one or more performance indicators.

Net Promoter or Net Promoter Score (NPS) is a management tool that can be employed to gauge the loyalty of a firm's customer relationships. NPS serves as an alternative to traditional customer satisfaction research and claims to be correlated with revenue growth. NPS is a metric that is derived from a question, such as, how likely is it that a respondent would recommend a company, product, and/or service to a friend or colleague? Respondents can be categorized as promoters, passives, or detractors. Promoters can include those respondents who respond with a score of 9 or 10 (e.g., on a scale of 1-10) and are considered loyal enthusiasts. Detractors can include those respondents who respond with a score of 0 to 6 (e.g., dissatisfied respondents). Passives can include those respondents who respond with a score of 7 or 8 (e.g., respondents who do not directly affect the NPS). NPS can be determined by subtracting the percentage of respondents who are detractors from the percentage of respondents who are promoters.

The one or more performance indicators of the live agents can include, but are not limited to, data which indicates the performance of a given agent such as average handle time (refers to the time the agent spends on a call resolving one or more issues), customer satisfaction survey ratings (e.g., which might be developed at the conclusion of a call or via on-line), attendance (refers to the presence of the agent in a capacity to work either physically, virtually, or remotely), work performance ratings (which can be developed based on subjective criteria, objective criteria, by a supervisor or otherwise), script compliance (this measures how often and how far the agent deviates from the prepared script and whether such deviations are desirable or not), workflow efficiency (this refers to processing time and the agent's ability to utilize tools correctly and efficiently to resolve customer issues), emotion events detected during a customer interaction (this refers to either a manual or automated notation, regarding an emotion which can utilize variations in volume, spoken words, etc., in conjunction with natural language understanding, review of recorded interactions, etc.), and a quality rating for the customer interaction (this refers to a calculation regarding the overall quality of the interaction as opposed to the agent's specific quality—it can take into account the difficulty level of the interaction as well as the customer satisfaction with the resolution).

Further, the category prediction model 435 can be learned by employing deep neural network structure 410. In particular, user queries, and subsequent messages described hereafter between users and live agents/virtual assistants, could be in the form of typed text and/or voice, and are, for example, transmitted to a routing module and on to their destination in the form of data packets. Each data packet, for example, includes a header indicating an identifier of the user device from which the query or voice call originates. The user queries or voice calls can be processed by the deep neural network structure 410.

The term "category" can refer to or pertain to the skills of an agent or to tasks completed by an agent. The skills exhibit the experience or competency or proficiency or aptitude or savviness or know-how of the agent in a variety of topics. The term "category" can refer to topics or subjects or fields or issues that the agent is proficient in. For example, an agent can be proficient in a variety of topics or categories related to a product. The product can be, e.g., a smart phone. The agent can be proficient in a variety of topics or categories for smart phones, such as, battery drain issues, frozen or slow interface, connectivity issues, stalled text messages, overheating, synching errors, app crashing, unresponsive screen, download issues, bad autocorrect suggestions, etc. One agent can have fielded several queries regarding the connectivity issues and stalled text messages topics or categories. This agent would probably have a high average NPS related to such topics, assuming he/she received ample positive feedback. As such, if a new query or voice call is received dealing with one of those issues or topics or categories, such agent with the highest average NPS in such categories would be selected as the preferred agent to field the new query or voice call.

Moreover, the task categories are evaluated based on multi-round conversations between the user and the system. Before the agent recommendation, the task could have multiple categories and each category can require a different skill set. In most cases, the category cannot be determined. However, the probability distribution of the category can be estimated and an agent with the best overall performance can be recommended by prediction over that distribution. It is noted that the exemplary embodiments pertain to a textual-based conversation system.

The deep neural network structure 410 can be part of an artificial intelligence module.

The artificial intelligence module for example includes an artificial intelligence engine having the functions of: natural language interaction, allowing spoken or written natural language received from a user to be interpreted, and natural language responses to be generated; a dynamic decision module corresponding to the function of making decisions, based on rules, on how to respond to user queries; an interaction memory, storing a history of interactions between a user and a live agent/virtual assistant, for example including messages sent to and from the user; and a behavior analysis function, which can include an algorithm for detecting certain aspects of the interaction with the user, such as emotion, which could indicate when a customer is not satisfied.

Thus, a machine learning component can be employed that uses, e.g., post-screening, post-training information about an agent and a pool of agents to optimize the deep neural networks based on new, empirical information about agent performance.

As a broad subfield of artificial intelligence, machine learning is concerned with the design and development of algorithms and techniques that allow computers to "learn." At a general level, there are two types of learning: inductive, and deductive. Inductive machine learning methods extract rules and patterns out of massive data sets. The major focus of machine learning research is to extract information from data automatically by computational and statistical methods, hence, machine learning is closely related to data mining and statistics. Embodiments of machine learning can appear in "supervised adaption" and "adaption of algorithms" to evaluate agent performance and assign a score to each agent based on prior performance.

An agent can be selected based on a skill set or expertise of the agent, as well as other factors such as geographic location, of the agent. The term "agent," "specialist," or "expert" refers to a service center personnel or a computerized application, in some cases, that respond to customer requests. An agent can be locally situated at the service center or remotely situated over a network. Throughout this application, the terms of "agent," "specialist," and "expert" are interchangeable terms dependent upon the circumstances. In most cases, the term of "agent" collectively refers to a customer representative, a support agent, a support specialist, a support expert, or a combination thereof, which can be a service center personnel and/or a computerized application.

A service center can be implemented in a centralized facility or server. Alternatively, a service center can be implemented in multiple facilities or servers in a distributed manner (e.g., cloud-based service platforms). A service center can provide services to a variety of products or services from a variety of clients or vendors. A client can be a manufacturer, a distributor, a retailer, a service provider or broker, a purchasing facility or a combination thereof. In one embodiment, a service center can include service APIs to communicate with other systems such as mobile devices, client sites, social communities, contact centers including agents or experts, client backend systems, manufacturer backend systems, eCommerce sites and other auxiliary systems (e.g., billing system). A service center can handle service requests from customers of multiple clients.

Note that a service center described throughout this application is not limited to a traditional service center or support center, nor is it implemented in a single physical location. A service center described herein represents a collection of service logic or providers communicatively coupled to each other over a network in a distributed or a cloud-based fashion. The term of a service center herein represents any kind of service providers that provide a variety of services to customers or users.

In one embodiment, a data warehouse can include a product database, a client database, a user database, and a knowledgebase. Product database can be configured to store any data related to the registered products including user manuals, etc. Client database can be configured to store information related to clients such as client's preferred communications mechanisms. User database can be employed to store information related users, such as, for example, registered products associated with a user, communications channel preference of a user, credentials necessary for a user to access other sites, and/or messaging filtering settings of a user, etc. Knowledgebase can be employed to store knowledge collected and compiled over a period of time, which can be used by agents and/or users for self-support purposes.

In one embodiment, the service center further includes a multi-channel communication and routing system to provide one or more communication channels to any user or client to concurrently access the service center. Examples of communication channels include email, chat, texting (e.g., short messaging services or SMS), voice (e.g., automated IVR, real-time, or VoIP), video, Web (e.g., Web conferencing), and/or online community forum (e.g., Facebook™ or Twitter™), etc. Note that the multi-channel communication and routing system can be fully or partially integrated with the service center or alternatively, it can be maintained or provided by a third party or partner (e.g., communicatively coupled via service API over a network).

Figure 5:
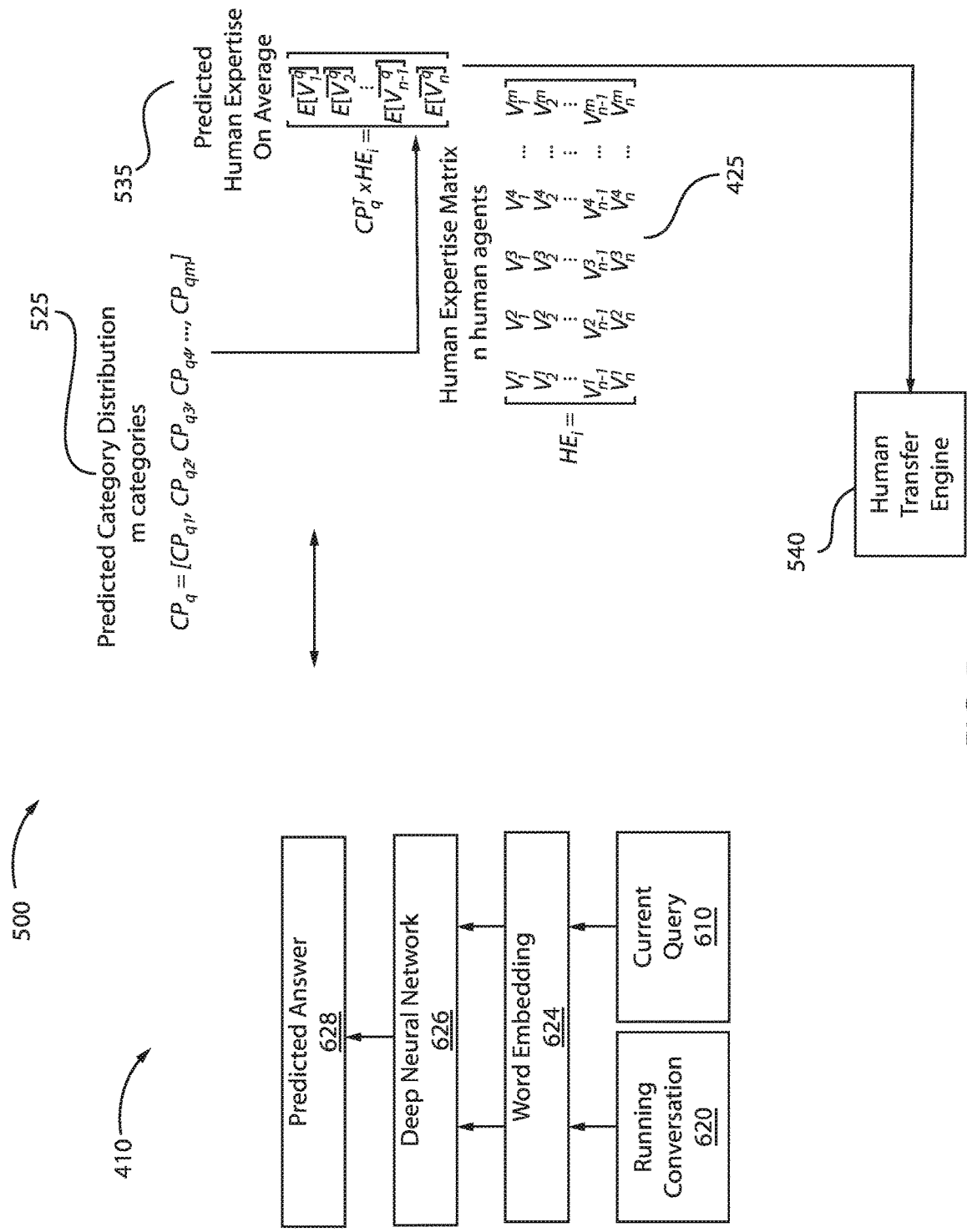
FIG. 5 is a block/flow diagram of an example system for determining running time, in accordance with an embodiment of the present invention.

FIG. 5 is a block/flow diagram of an example system for determining running time, in accordance with an embodiment of the present invention.

The system 500 for determining running time includes employing the human expertise matrix 425 with a predicted category distribution 525 to calculate predicted human expertise 535 on average to allow the human transfer engine 540 to select the preferred live agent to answer the query or voice call from a customer/user.

Figure 6:
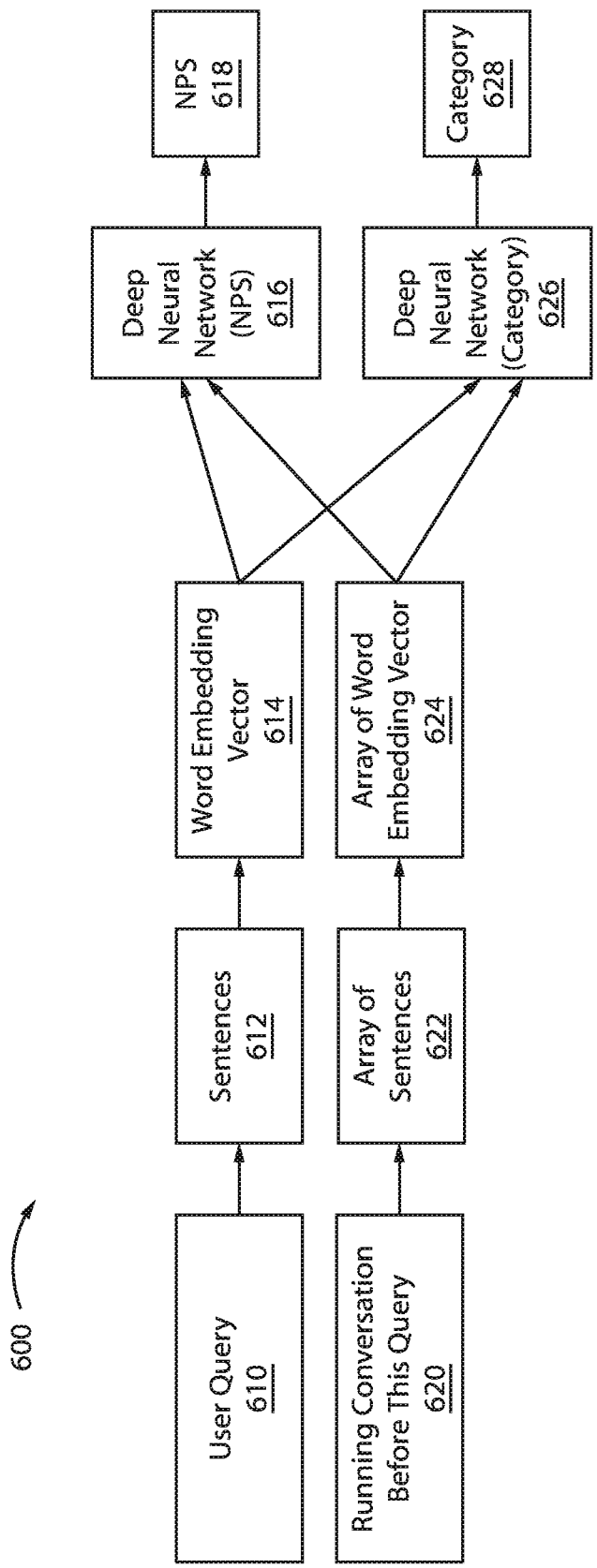
FIG. 6 is a block/flow diagram illustrating a method for processing conversations, in accordance with an embodiment of the present invention.

FIG. 6 is a block/flow diagram illustrating a method for processing conversations, in accordance with an embodiment of the present invention.

The conversation processing flow 600 can be described as follows:

A user query 610 is received by, e.g., a call center. The user query 610 can be broken down into sentences 612. The sentences 612 can be broken down into word vectors 614 by word embedding techniques. In other words, words or phrases from the sentences 612 are mapped to vectors 614 of real numbers. The word vectors 614 are then fed into a first deep neural network 616 and are also fed into a second deep neural network 626. The first neural network 616 can process NPS data, whereas the second neural network 626 can process category or skill data. The first neural network 616 outputs an NPS value 618, whereas the second neural network 626 outputs category data 628. Moreover, the conversation 620 before the query 610 is also analyzed. The conversation 620 before the query 610 can be broken down into an array of sentences 622. The array of sentences 622 can be broken down into an array of word vectors 624 by word embedding techniques. The array of word vectors 624 are then fed into the first deep neural network 616 and are also fed into the second deep neural network 626. The first neural network 616 can process NPS data, whereas the second neural network 626 can process category or skill data in view of the word vectors 614 from the user query 610 and the array of word vectors 624 from the conversation 620 before the query 610. The first neural network 616 outputs an NPS value 618, whereas the second neural network 626 outputs category data 628 based on both the word vectors 614 from the query 610 and the array of word vectors 624 from the conversation 620 before the query 610. Therefore, there are two deep neural networks 616, 626 and two kinds of deep neural network outputs 618, 628. Each neural network 616, 626 has two inputs, that is, a current user query 610 and the current running conversation 620 before the user query 610.

Figure 7:
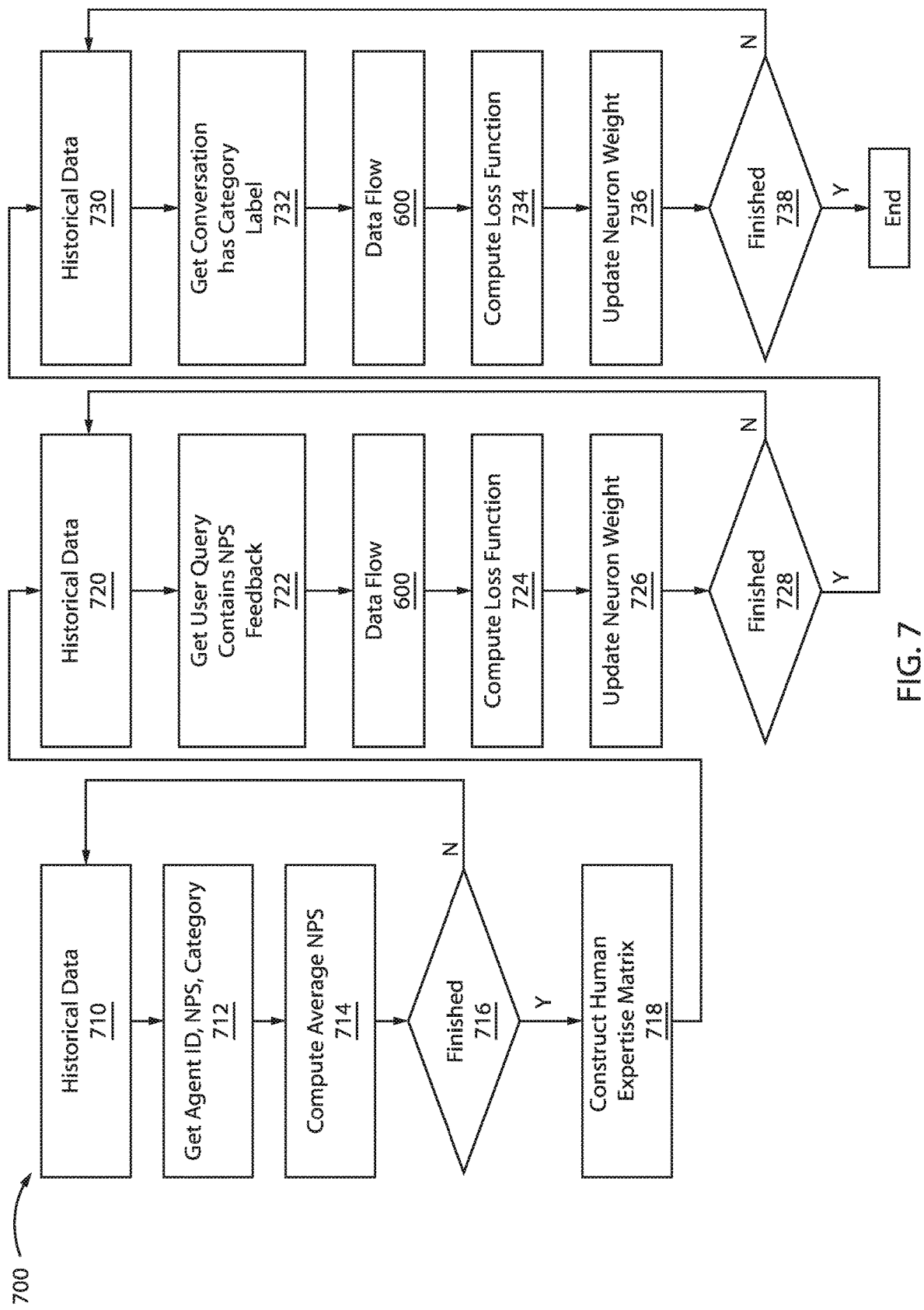
FIG. 7 is a block/flow diagram illustrating a method for determining the training time, in accordance with an embodiment of the present invention.

FIG. 7 is a block/flow diagram 700 illustrating a method for determining the training time, in accordance with an embodiment of the present invention.

At block 710, the historical data related to each agent is collected. The historical data can be, e.g., feedback received from previous customers.

At block 712, the ID, the NPS, and the categories related to an agent are obtained.

At block 714, the average NPS can be computed for an agent.

At block 716, it is determined whether the data has been collected for all the agents. If YES, the process proceeds to block 718 where the human expertise matrix is determined to construct the first deep neural network, that is, the NPS neural network. If NO, the process proceeds to block 710 to obtain the data/information for the remaining agents.

At block 720, after the human expertise matrix has been constructed, the deep learning training commences to construct the first neural network. At block 720, the historical data related to an agent is collected.

At block 722, obtain each user query that includes NPS feedback in the historical data of block 720.

At block 600, the dataflow 600 of FIG. 6 is executed.

At block 724, a loss function is computed. The loss function is computed by comparing the output of the neural networks and the historical data.

At block 726, the neuron weight is updated. The neuron weights are updated to optimize the accuracy of the neural networks.

At block 728, it is determined whether the data has been collected for all the agents. If YES, the process proceeds to block 730 where the second deep neural network is constructed, that is, the category deep neural network. If NO, the process proceeds to block 720 to obtain the data/information for the remaining agents.

Therefore, in blocks 720-728, the NPS deep neural network is constructed based on all the live agents. Thus, block 720-728 process NPS data.

At block 730, the deep learning training continues to construct the second neural network. At block 730, the historical data related to an agent is collected.

At block 732, obtain the conversations before the query in block 722.

At block 600, the dataflow 600 of FIG. 6 is executed.

At block 734, a loss function is computed. The loss function is computed by comparing the output of the neural networks and the historical data.

At block 736, the neuron weight is updated. The neuron weights are updated to optimize the accuracy of the neural network.

At block 738, it is determined whether the data has been collected for all the agents. If YES, the process ends because both the first and second deep neural networks have been constructed based on all live agents. If NO, the process proceeds to block 730 to obtain the data/information for the remaining agents.

Therefore, in blocks 730-738, the category or skills deep neural network is constructed based on all the live agents. Thus, block 730-738 process category or skill data.

Therefore, the flowchart 700 includes 3 parts. The first part (blocks 710-718) pertains to the human expertise analytics, the second part (blocks 720-728) pertains to the NPS deep learning training, and the third part (blocks 730-738) pertains to the category deep learning training.

Figure 8:
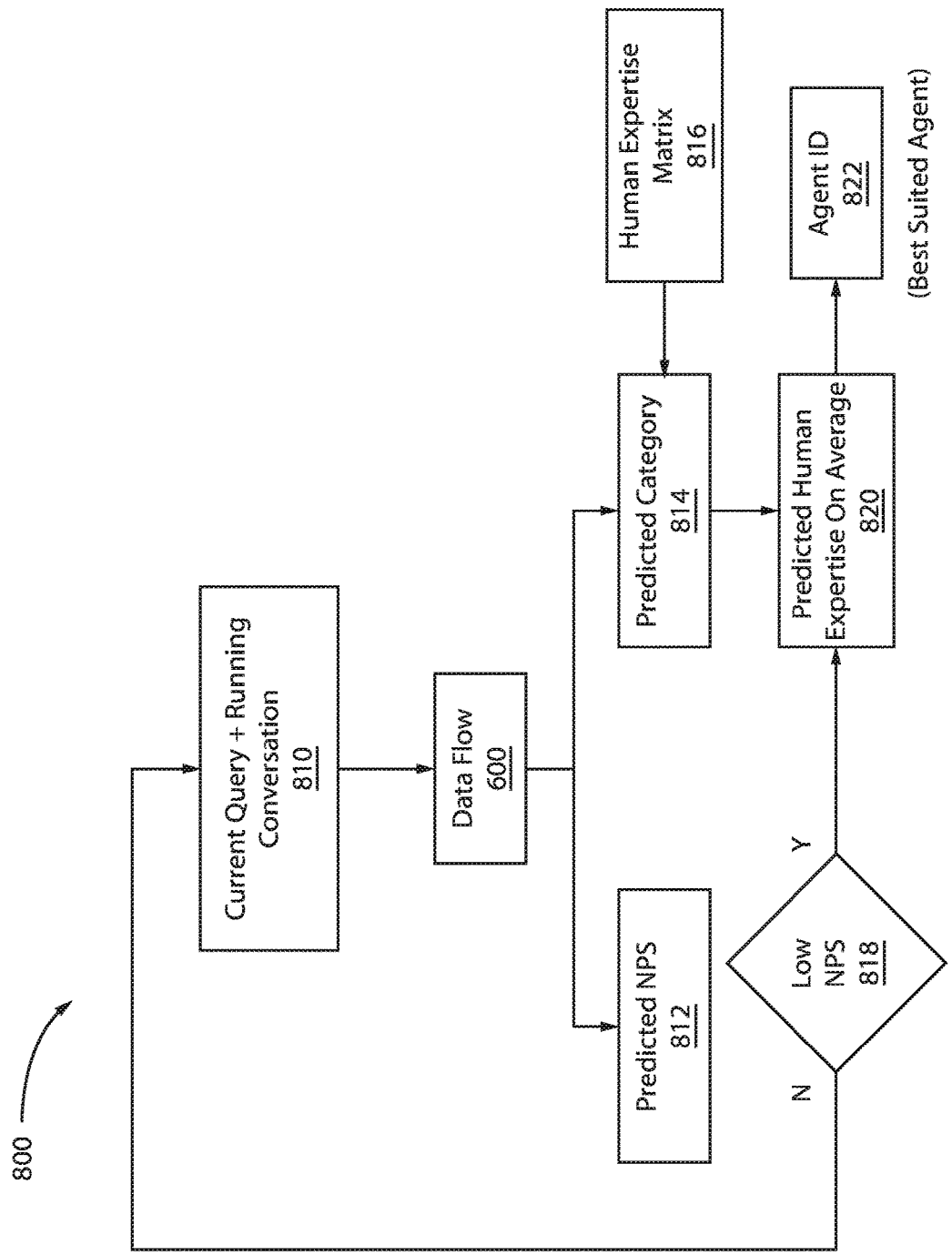
FIG. 8 is a block/flow diagram illustrating a method for determining the running time, in accordance with an embodiment of the present invention.

FIG. 8 is a block/flow diagram 800 illustrating a method for determining the running time, in accordance with an embodiment of the present invention.

At block 810, the current query and the running conversation are obtained.

At block 600, the dataflow 600 of FIG. 6 is executed.

At block 812, the predicted NPS is computed. The predicted NPS is computed from the NPS deep neural network (blocks 720-728 of FIG. 7).

At block 814, the predicted category is computed. The predicted category is computed from the category deep neural network (blocks 730-738 of FIG. 7).

At block 816, the human expertise matrix (blocks 710-718 of FIG. 7) is also employed in cooperation with the predicted NPS at block 812 and the predicted category at block 814 to determine the predicted human expertise on average.

At block 820, the predicted human expertise on average is determined.

At block 818, it is determined whether the output is the lowest predicted NPS. If NO, then the process proceeds back to block 810. If YES, the process proceeds to block 822.

At block 822, the agent is selected as the preferred agent with the highest predicted or calculated NPS. In other words, this is the agent selected to answer the query posed by the consumer or user.

Figure 9:
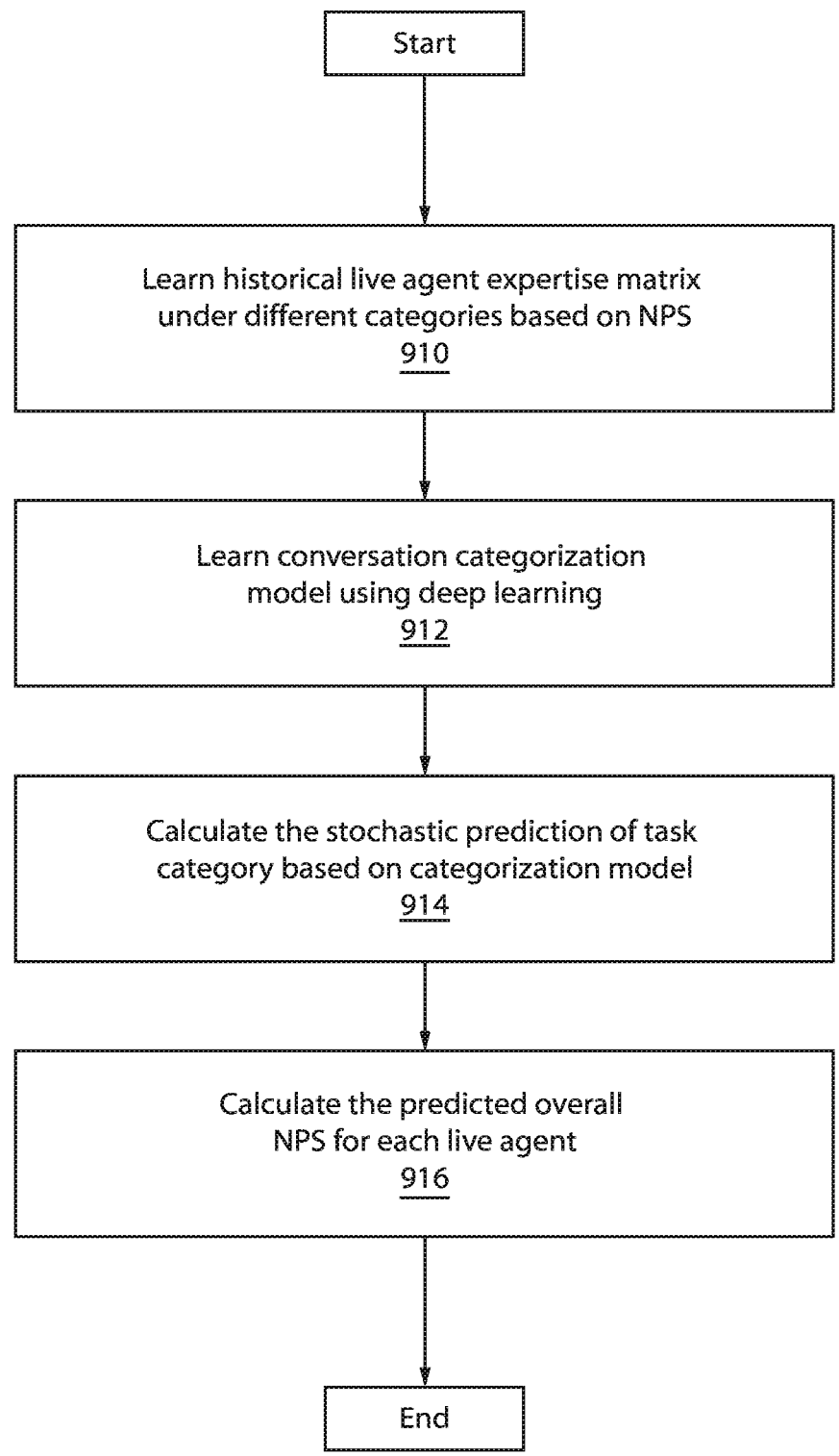
FIG. 9 is a block/flow diagram illustrating a method for making a live agent recommendation, in accordance with an embodiment of the present invention.

FIG. 9 is a block/flow diagram illustrating a method for making a live agent recommendation, in accordance with an embodiment of the present invention.

At block 910, the historical live agent expertise matrix is learned under different categories based on NPS. The live agent expertise matrix is computed for each agent. The live agent expertise matrix includes the computed average NPS for each category of a plurality of categories.

At block 912, the conversation categorization model is learned by employing deep learning. The deep learning can include employing two deep learning networks, one for NPS and another for categories.

At block 914, the stochastic prediction of task category is calculated based on the categorization model. The task categories are evaluated based on multi-round conversations between users and the system.

At block 916, the predicted overall NPS for each live agent is calculated. The agent with the highest overall NPS is selected to answer the query posed by a user/consumer.

Figure 10:
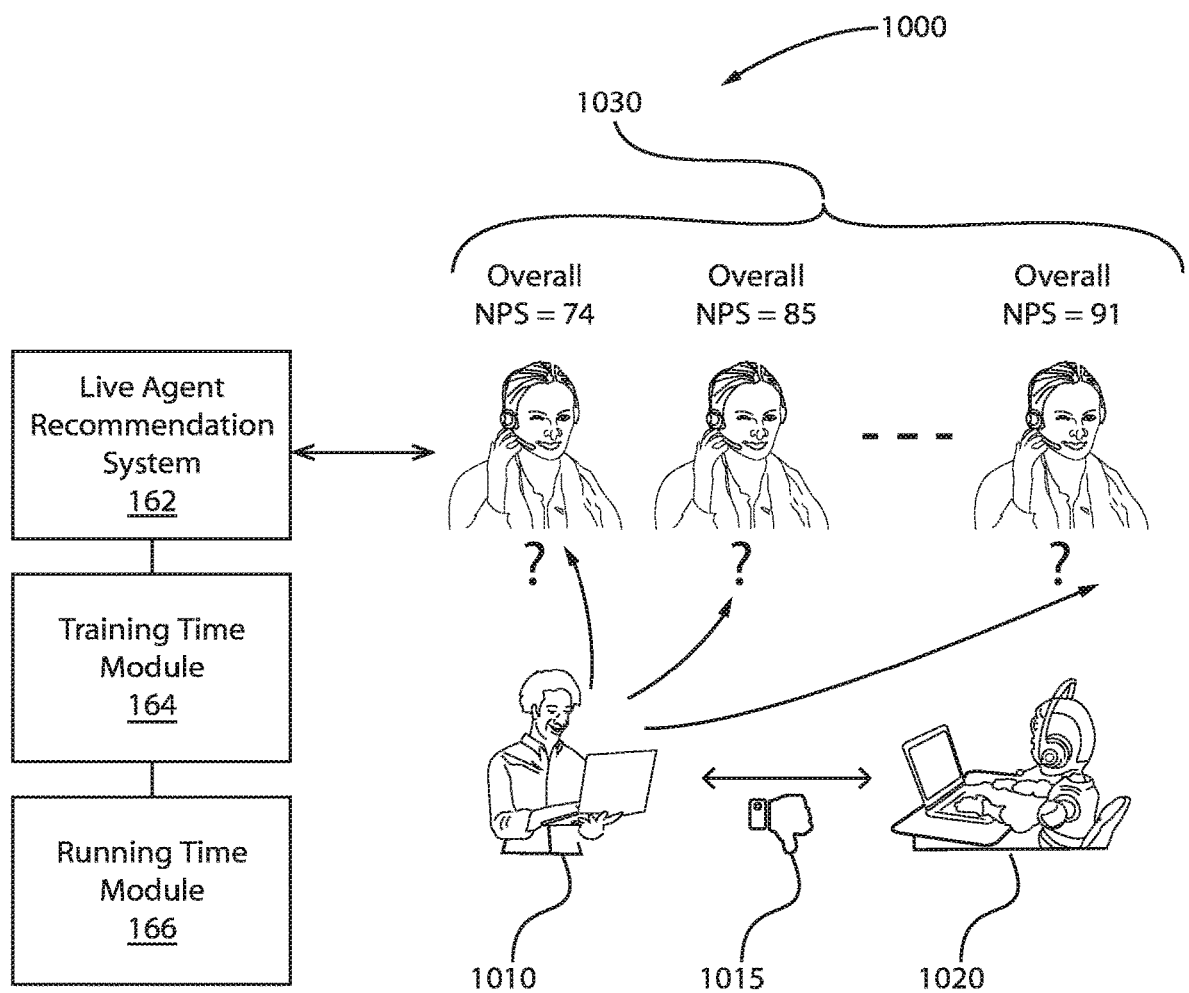
FIG. 10 is a block/flow diagram illustrating the selection of an agent with the highest overall net promoter score (NPS) for answering a question, in accordance with an embodiment of the present invention.

FIG. 10 is a block/flow diagram illustrating the selection of an agent with the highest overall NPS for answering a question, in accordance with an embodiment of the present invention.

The system 1000 can include a user 1010 that establishes a communication line 1015 with a IVR-type interface 1020. In one instance, the user 1010 is not able to obtain a satisfactory answer from the IVR-type interface 1020. As a result, a live agent needs to be selected to answer the user or customer's 1010 question. A plurality of live agents 1030 can be available to answer the customer's 1010 question. However, a determination needs to be made as to which live agent 1030 to select. The live agent recommendation system 162 can aid in the selection of the live agent 1030. The live agent recommendation system 162 can employ the training time module 164 and the running time module 166. The training time module 164 employs the structure 400 (FIG. 4) and the running time module 166 employs the structure 500 (FIG. 5). The live recommendation system 162 computes an overall NPS for each agent 1030. The first live agent can have an overall NPS of 74, the second live agent can have an overall NPS of 85, and the third live agent can have an overall NPS of 91. As such, the system 162 selects the third agent having the overall NPS of 91, which is the highest score of all the agents available at this time. Thus, the third agent is deemed to be best suited or most-highly equipped or preferred agent to answer the question by the customer 1010. The preferred agents can be those having previous experiences with the user and having ratings rated by the user, for example, higher than a predetermined threshold.

In system 1000, inbound and outbound calls from and to the end users devices of end users 1010 can traverse a telephone, cellular, and/or data communication network depending on the type of device that is being used. For example, the communications network can include a private or public switched telephone network (PSTN), local area network (LAN), private wide area network (WAN), and/or public wide area network such as, for example, the Internet. The communications network can also include a wireless carrier network including a code division multiple access (CDMA) network, global system for mobile communications (GSM) network, and/or any 3G or 4G network conventional in the art, and/or an LTE or any future public communication network.

A user 1010 (also referred to herein as a customer) can activate an application from the user's mobile device to reach agents of the service center via a variety of communication channels or media, such as, for example, email, chat, voice (including automated interactive voice recognition or IVR, voice over Internet protocol or VoIP), video, Web, and/or online community-based forum, etc. The application can be a thin/thick client application or a Web-based application.

According to one exemplary embodiment of the present invention, a contact center can include an intelligent automated agent 1020 for handling calls or other interactions (e.g., web) with customers. The automated agent 1020 can be implemented, for example, on a server. The automated agent 1020, for example, can include capabilities, such as voice recognition, speech recognition, answer generation, speech generation, and customer profile information that enables the automated agent 1020 to perform agent roles without having to use a live agent. For instance, in one embodiment, the automated agent 1020 can maintain a database of customer profile information (for example, as stored on a nonvolatile storage device, such as a disk drive or mass storage device) that can be updated with each interaction between the customer and the contact center.

Furthermore, according to one embodiment, at a conclusion of the live support session, a survey module can be configured to transmit a survey to remote device to allow the user 1010 to provide a feedback, such as a rating, concerning quality of the selected agent 1030. The feedback can be employed to update the ratings of the selected agent in general, as well as a rating of the agent as a preferred agent associated with the user. Such a rating can affect a subsequent selection of recommended agent candidates and preferred agent candidates. Therefore, after each of the support sessions, a user 1010 will be given the opportunity to provide feedback on the specialist which can be seen by the next user requesting a similar support need or themselves as they engage in future support sessions. Rating feedback is cumulative for a specialist and establishes a specialist as a skilled professional as rated by the people he/she supports. This form of "crowd" based feedback ensures that the specialist maintains a level of professionalism, sensitivity to the nature of the users problem and instilling confidence in the resolutions provided to the user.

In summary, the exemplary embodiments of the present invention recommend human agents based on stochastic prediction of task category in a human-robot symbiosis conversation system. The exemplary embodiments provide for a result-driven approach that maximizes NPS based on human agent performance under different categories. Thus, live agent recommendation can be achieved for conversations with multiple task categories. In other words, for a conversational system, in the case where robots cannot handle the questions adequately, the conversation should transfer to a human agent for further service. However, human agents are not equally capable of handling all types of questions. Live agent recommendation is the key to the success of the human agent transfer. The issue is to whom the conversation should be transferred to, in order to maximize the overall service quality.

To maximize the overall service, live agent recommendation is result driven to maximize the net promoter score (NPS), in the following steps: learn live agent expertise matrix under different categories based on NPS, learn conversation categorization model using deep learning, calculate the stochastic prediction of task category based on the categorization model, and calculate the predicted overall NPS for each live agent and make a recommendation.

Therefore, the exemplary embodiments make recommendations based on a stochastic prediction of a task category in a human-robot symbiosis conversation system. In a human symbiosis conversational system, the running task category is not static. Instead, the running task often varies in a dynamic and stochastic way, especially when multiple categories overlap with each other. The recommendation system of the present exemplary embodiments solves the issue where dynamic tasks are distributed in a probability space.

In a complex situation, a conversation session can include multiple tasks, which need a certain expertise matrix for a live agent. The best or preferred live agent is the one who is good at overall performance for multiple types of tasks. The exemplary embodiments provide support for multiple task scoring based on historical performance for different categories. This result-driven approach makes recommendations to maximize NPS based on human agent performance under difference categories, which is a quantitative end-to-end method. Based on deep learning and historical NPS data, this approach not only provides the best or preferred agent, but also the predicted scores for all the live agents. This recommendation approach provides users with an in-depth flexibility of choosing agents upon the availability and geometric locations, and explainability of comparing and choosing a live agent.

In one or more embodiments, a graphical user interface (GUI) presentation of information about the specialists can be presented to users that they can utilize to select the specialist of their choice from a list of specialists that receive a high NPS. Examples of such information includes (but not limited to): a) specialist photo; b) specialist brief biography; c) current level rating based on user feedback (rating); d) current availability (e.g., available, currently handling another user); and e) expected wait time for a specialist (based on analysis of all other users who can have queued up to for support from a specialist as well as his/her average handle time of an interaction).

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for a live agent recommendation for a human-robot symbiosis conversation system (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed on a processor for selecting a preferred live agent from a plurality of live agents linked within a live agent communication network, the computer-implemented method comprising:
   employing an artificial intelligence engine to perform operations including:
      constructing a human expertise matrix pertaining to each of the plurality of live agents by determining an average net promoter score (NPS) for each of the plurality of live agents for each category of a plurality of categories;
      in response to a voice call by a user, implementing a first deep neural network to determine a predicted NPS and implementing a second deep neural network to determine a predicted category;
      determining a predicted human expertise on average by collectively assessing the human expertise matrix, the predicted NPS, and the predicted category; and
      based on the predicted human expertise on average determined, triggering communication via the live agent communication network between the user and the preferred live agent to initiate a conversation between the user and the preferred live agent.

2. The method of claim 1, wherein overall service quality in the live agent communication network is maximized by improving a selection process of the preferred live agent, the selection process improved by maximizing the average NPS for each live agent of the plurality of live agents based on good overall agent performance for multiple types of categories.

3. The method of claim 1, wherein the first deep neural network is employed to compute the predicted NPS and the second deep neural network is employed to compute the predicted category.

4. The method of claim 1, further comprising computing a loss function for each of the first and second deep neural networks.

5. The method of claim 4, further comprising updating a neuron weight of each of the first and second deep neural networks.

6. The method of claim 1, wherein the first and second deep neural networks are employed to create a conversation categorization model.

7. The method of claim 6, wherein a stochastic prediction of each category for each of the plurality of agents is determined based on the conversation categorization model.

8. A non-transitory computer-readable storage medium comprising a computer-readable program executed on a processor in a data processing system for selecting a preferred live agent from a plurality of live agents, wherein the computer-readable program when executed on the processor causes the data processing system to perform the steps of:
   employing an artificial intelligence engine to perform operations including:
      constructing a human expertise matrix pertaining to each of the plurality of live agents by determining an average net promoter score (NPS) for each of the plurality of live agents for each category of a plurality of categories;
      in response to a voice call by a user, implementing a first deep neural network to determine a predicted NPS and implementing a second deep neural network to determine a predicted category;
      determining a predicted human expertise on average by collectively assessing the human expertise matrix, the predicted NPS, and the predicted category; and
      based on the predicted human expertise on average determined, triggering communication via the live agent communication network between the user and the preferred live agent to initiate a conversation between the user and the preferred live agent.

9. The non-transitory computer-readable storage medium of claim 8, wherein overall service quality in the live agent communication network is maximized by improving a selection process of the preferred live agent, the selection process improved by maximizing the average NPS for each live agent of the plurality of live agents based on good overall agent performance for multiple types of categories.

10. The non-transitory computer-readable storage medium of claim 8, wherein the first deep neural network is employed to compute the predicted NPS and the second deep neural network is employed to compute the predicted category.

11. The non-transitory computer-readable storage medium of claim 8, wherein a loss function is computed for each of the first and second deep neural networks.

12. The non-transitory computer-readable storage medium of claim 11, wherein a neuron weight is updated for each of the first and second deep neural networks.

13. The non-transitory computer-readable storage medium of claim 8, wherein the first and second deep neural networks are employed to create a conversation categorization model.

14. The non-transitory computer-readable storage medium of claim 13, wherein a stochastic prediction of each category for each of the plurality of agents is determined based on the conversation categorization model.

15. A system for selecting a preferred live agent from a plurality of live agents, the system comprising:
- a memory;
- one or more processors in communication with the memory; and
- an artificial intelligence engine to perform operations including:
    - constructing a human expertise matrix pertaining to each of the plurality of live agents by determining an average net promoter score (NPS) for each of the plurality of live agents for each category of a plurality of categories;
    - in response to a voice call by a user, implementing a first deep neural network to determine a predicted NPS and implementing a second deep neural network to determine a predicted category;
    - determining a predicted human expertise on average by collectively assessing the human expertise matrix, the predicted NPS, and the predicted category; and
    - based on the predicted human expertise on average determined, triggering communication via the live agent communication network between the user and the preferred live agent to initiate a conversation between the user and the preferred live agent.

16. The system of claim 15, wherein overall service quality in the live agent communication network is maximized by improving a selection process of the preferred live agent, the selection process improved by maximizing the average NPS for each live agent of the plurality of live agents based on good overall agent performance for multiple types of categories.

17. The system of claim 15, wherein the first deep neural network is employed to compute the predicted NPS and the second deep neural network is employed to compute the predicted category.

18. The system of claim 15, wherein a loss function is computed for each of the first and second deep neural networks.

19. The system of claim 18, wherein a neuron weight is updated for each of the first and second deep neural networks.

20. The system of claim 15, wherein the first and second deep neural networks are employed to create a conversation categorization model.

* * * * *